United States Patent [19]

Urano et al.

[11] 4,202,617
[45] May 13, 1980

[54] SHUTTER RELEASE SECURITY DEVICE IN MOTOR DRIVE CAMERA

[75] Inventors: Fumio Urano, Omiya; Akihiro Arai, Urawa; Takumi Kobayashi; Junji Umetsu, both of Tokyo, all of Japan

[73] Assignee: Asahi Kogaku Kogyo Kabushiki Kaisha, Tokyo, Japan

[21] Appl. No.: 906,804

[22] Filed: May 17, 1978

[30] Foreign Application Priority Data

May 31, 1977 [JP] Japan ................... 52-63547

[51] Int. Cl.² .................................... G03B 17/38
[52] U.S. Cl. ...................... 354/268; 354/173
[58] Field of Search ............ 354/173, 207, 266, 268, 354/153, 152

[56] References Cited

U.S. PATENT DOCUMENTS

| | | | |
|---|---|---|---|
| 3,693,524 | 9/1972 | Furuta | 354/268 |
| 3,932,878 | 1/1976 | Kurei | 354/268 |
| 3,947,858 | 3/1976 | Ishida | 354/268 |
| 4,096,503 | 6/1978 | Sato | 354/268 |
| 4,119,987 | 10/1978 | Beach | 354/268 |

*Primary Examiner*—L. T. Hix
*Assistant Examiner*—Alan Mathews
*Attorney, Agent, or Firm*—Sughrue, Rothwell, Mion, Zinn and Macpeak

[57] ABSTRACT

A locking device is provided for preventing the mirror release until the completion of the winding operation. In its preferred embodiment, the locking device comprises a locking lever pivotally mounted on the end of the lower curtain release lever and engaging a cut in the mirror release pin to prevent the movement thereof until the lower curtain release lever pivots at the end of the winding operation.

4 Claims, 4 Drawing Figures

SHUTTER RELEASE SECURITY DEVICE IN MOTOR DRIVE CAMERA

BACKGROUND OF THE INVENTION

In manually carrying out the shutter release of a camera, the operating member is usually designed to be operated with a relatively great power in order to prevent an erroneous operation. On the other hand, in a camera with a motor drive device, the shutter release is effected by an electrical signal, and a separate release operation section is often built into the motor drive device and the release resistance for preventing erroneous operation may be smaller. Accordingly, in order to reduce the energy consumption, the mirror raising mechanism is directly released without the manually operable release member in a camera using the motor drive device.

However, the charging of the operating power is, in general, accomplished prior to the setting of the shutter mechanism or completion of the film winding mechanism. Thus, if the release is effected at that instant, then only the mirror mechanism may be operated without the shutter mechanism, or exposure may be effected during the winding operation.

SUMMARY OF THE INVENTION

Accordingly, it is an object of this invention to render it impossible to carry out the shutter release during the winding operation to thereby prevent such erroneous operation. Briefly, this is achieved in a camera having a releasing member operable by a motor drive to directly release the mirror by providing a locking mechanism which engages the releasing member to prevent movement thereof during film winding. In the preferred embodiment, the locking mechanism is an arm mounted on the free end of the bottom curtain locking lever, the arm engaging a cooperating recess in the releasing member when the bottom curtain is unlocked and disengaging when the curtain is locked to permit shutter release.

BRIEF DESCRIPTION OF THE DRAWINGS

One embodiment of this invention will now be described with reference to the accompanying drawings, in which.

DETAILED DESCRIPTION OF THE INVENTION

Figure 1:
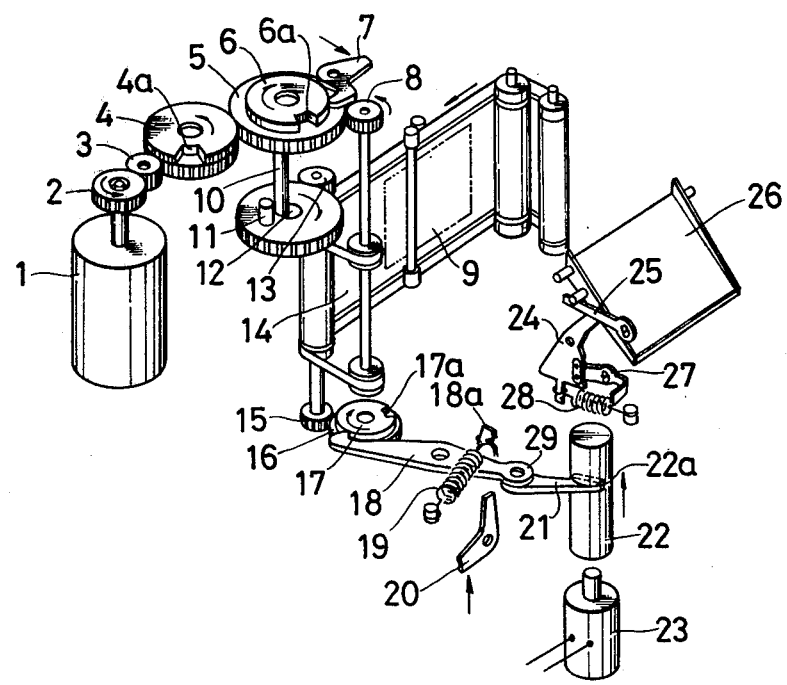
FIG. 1 is a perspective view showing one embodiment of this invention.

In FIG. 1, the driving power from a motor 1 is transmitted through gears 2 and 3 to a gear 4 which is coupled to a gear 5. However, since the gear 4 has a notch 4a, the gear 4 is intermittently disengaged from the gear 5. The gear 5 is provided with a top curtain locking cam 6 having a notch 6a which may be locked by a top curtain locking lever 7. When the notch 6a is locked by the lever 7, transmission of the driving power from the motor 1 is interrupted by means of the notch 4a. A pin 10 embedded in the gear 6 and radially spaced from the center thereof is engaged with a pin 11 embedded in a gear 12 to thereby drive the latter. A top curtain 9 and a bottom curtain 14 are wound and charged through pinions 8 and 13, respectively. On the other hand, a gear 16 is turned by a pinion 15 provided at the lower end of the pinion 13 so as to cause the notch 17a of a bottom curtain locking cam 17 to engage a bottom curtain locking lever 18. The bottom curtain locking lever 18 is coupled through a coupling shaft 29 to a release locking lever 21 in such a manner that the release locking lever 21 is moved away from the cut 22a in a release pin 22 by means of a spring 19. Reference numeral 23 designates a solenoid which is the release means of a motor drive mechanism. The release means operates to drive the release pin 22 thereby to turn a mirror locking lever 27, as a result of which the locking of the mirror mechanism is released. A mirror raising lever 24 is turned by the elastic force of a spring 28, as a result of which a mirror 26 is raised or drawn in by means of a lever 25. At the end of the mirror mechanism's operation, the top curtain locking lever 7 is moved in the direction of the arrow as indicated in FIG. 1 to start both the running of the top curtain and the exposure. A predetermined period of time after the start of the running of the top curtain 9, a bottom curtain release lever 20 is turned by an electrical or mechanical means (not shown) in a well-known manner, as a result of which the bottom curtain locking lever 18 is operated to run the bottom curtain 14 and, thus, the exposure has been completed.

Since the arrangement and operation of the elements as so far described are well known in the art, no further description will be necessary.

Figure 2:
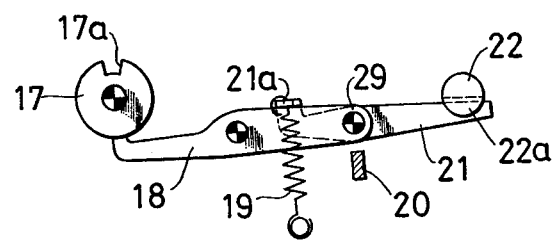
FIG. 2 is a plan view showing a state of the most essential parts in the embodiment of the invention during the winding operation.
Figure 3:
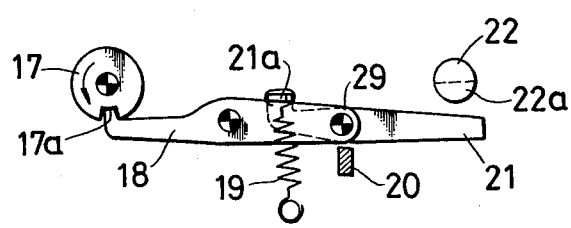
FIG. 3 is a plan view showing a state of the most essential parts at the completion of the winding operation.
Figure 4:
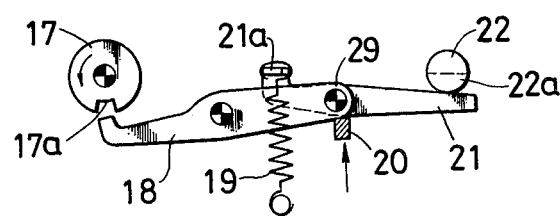
FIG. 4 is also a plan view showing a state of the most essential parts at the release of the bottom curtain locking.

Now, the essential parts of the camera of FIG. 1 wherein the specific feature of this invention resides will be more clearly described with reference to FIGS. 2, 3 and 4 which show the states of the essential parts as they occur during the winding operation, at the completion of the winding operation and at the release of the bottom curtain locking lever, respectively.

During the winding operation (FIG. 2), the bottom curtain locking lever 18 is slidably in contact with the circumferential wall of the bottom curtain locking cam 17 with the aid of the spring 19, and the release locking lever 21 is in engagement with the cut 22a in the release pin 22. Therefore, even if the solenoid 23 is energized, the release pin 22 cannot be operated and, accordingly, the mirror locking lever 27 cannot be operated. Thus, even if the release mechanism in the motor drive device is operated erroneously during the winding operation which is effected after exposure of the film is completed, the mirror mechanism and the shutter mechanism will never be operated.

When the winding operation is completed (FIG. 3), the end portion of the bottom curtain locking lever 18 is allowed to drop in (or engage with) the notch 17a of the bottom curtain locking cam 17. As a result, the release locking lever 21 is disengaged from the cut 22a in the release pin 22, the release pin 22 can be operated by the solenoid 23 to turn the mirror locking lever 27, thus operating both the mirror mechanism and the shutter mechanism.

In the case where a bottom curtain release signal is applied to the bottom curtain release lever 20 (the lever 20 being moved in the direction of the arrow), the bottom curtain locking lever 18 is turned to release the locking of the bottom curtain locking cam 17 and, therefore, the bottomcurtain 14 is allowed to run, thus completing exposure. In this case, as the cut 22a of the release pin 22 has been moved relative to the release locking lever 21, the lever 21 is abutted against the outer wall of the release pin 22, as a result of which the lever 21 is turned about the coupling shaft 29 and is set; with the aid of the spring 19. The bottom curtain locking cam 17 is then turned in the direction of the arrow (FIG. 4) in association with the bottom curtain 14 and, upon completion of the bottom curtain run, the bottom curtain locking cam 17 is stopped. In this connection, if the turning angle of the cam 17 is made to be smaller than 360°, for instance 180°, by changing the gear ratio of the gears 15 and 16, the cam 17 will reach the state shown in FIG. 2, at which time the bottom curtain release lever 20 and the release pin 22 are restored. As a result, the bottom curtain locking lever 18 and the release locking lever 21 are returned to the state shown in FIG. 2.

Thus, according to this invention, during the winding operation the release by the motor drive device is prevented. That is, according to the invention a shutter release securing device is provided in a motor drive camera, in which the shutter release before the completion of shutter charge or the film winding operation is prevented. Furthermore, the erroneous exposure of the film, the erroneous operation of the shutter mechanism and the occurrence of jamming or other inoperative conditions are prevented.

Although only one embodiment of the present invention has been shown and described, it will be understood that various changes may be made therein without departing from the spirit and scope of the invention. For example, in the above-described embodiment, the release locking lever is interlocked with the bottom curtain locking lever; however, it is obvious that it may be interlocked with the top curtain locking lever 7, the reverse rotation stop lever in the film mechanism, or any part if it is operated either at the completion of the winding operation or during the time interval which elapses from the release till the next winding operation. Furthermore, the shutter need not be limited to the focal plane shutter only, and instead of the top curtain locking lever a shutter open locking lever or a shutter closure locking lever may be employed.

What is claimed is:

1. In a camera having a manually operable shutter release member, a mirror, a mirror locking releasing member for releasing said mirror to carry out shutter release and a motor drive means for directly operating said mirror locking releasing member, the improvement comprising:

a shutter release security device for preventing shutter release during film winding, said security device comprising an operation locking member movable between a first position, said locking member preventing movement of said mirror locking releasing member whenever said locking member is in its first position, and a second position, in which it is disengaged from said mirror locking releasing member to permit operation of the latter by said motor drive unit, and a control means for maintaining said operation locking member in its first position during film winding and moving said operation locking member to its second position at the completion of film winding.

2. A camera as claimed in claim 1, wherein said control means comprises a bottom curtain locking lever to which said operation locking member is connected, said bottom curtain locking lever maintaining said operation locking member in said second position when the bottom curtain is locked and biasing said operation locking member toward said first position when said bottom curtain is unlocked.

3. A camera as claimed in claim 1, wherein said control means comprises a shutter open locking lever.

4. A camera as claimed in claim 1, wherein said control means comprises a shutter closure locking lever.

* * * * *